June 7, 1966  W. G. P. DOYLE ETAL  3,254,832
ROTATING LIQUID LIQUID COUNTER AND CO-CURRENT EXCHANGE DEVICE
WITH INTERCHANGEABLE SEPARATOR
Filed Nov. 16, 1964  5 Sheets-Sheet 1

INVENTORS
WLADZIA G. PODBIELNIAK DOYLE
COLLIN M. DOYLE
BY Mullin and Alter
ATTORNEYS

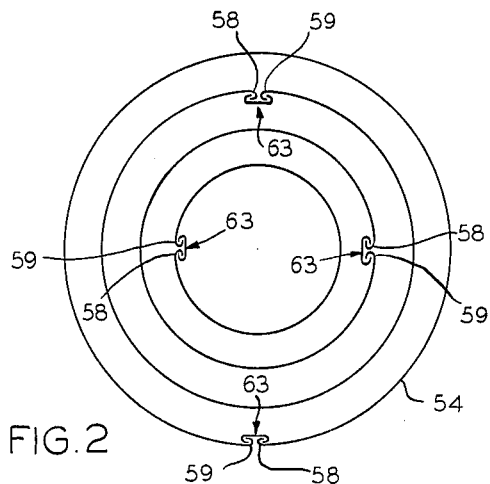
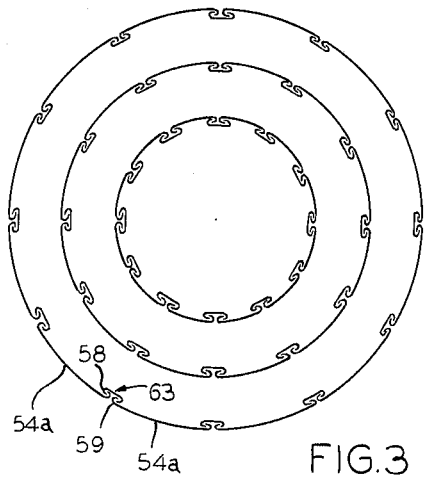
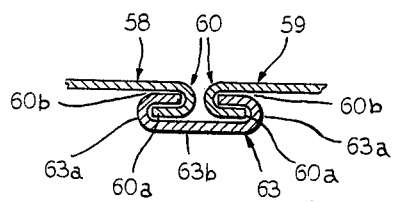
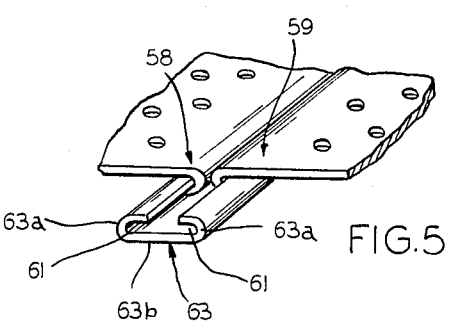
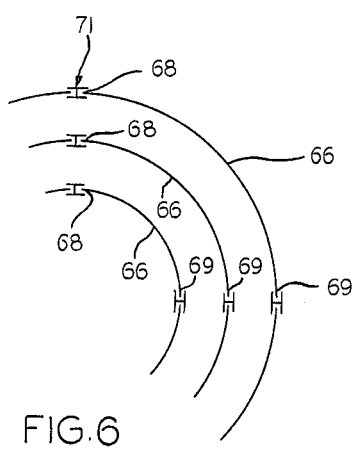
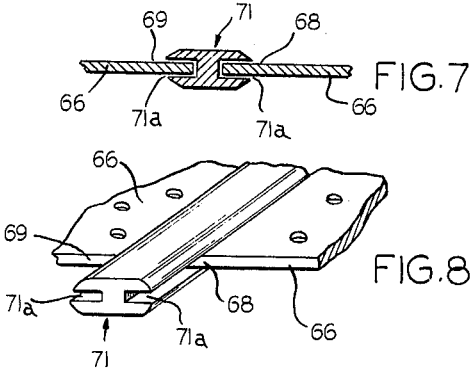
INVENTORS
WLADZIA G. PODBIELNIAK DOYLE
COLLIN M. DOYLE
BY *Mullin and Alter*
ATTORNEYS INVENTORS
WLADZIA G. PODBIELNIAK DOYLE
COLLIN M. DOYLE
BY *Mullin and Alter*
ATTORNEYS

3,254,832
ROTATING LIQUID LIQUID COUNTER AND CO-CURRENT EXCHANGE DEVICE WITH INTERCHANGEABLE SEPARATOR
Wladzia G. Podbielniak Doyle and Collin M. Doyle, both of 21 W. Elm St., Chicago, Ill.
Filed Nov. 16, 1964, Ser. No. 411,447
13 Claims. (Cl. 233—15)

This invention relates generally to improvements in centrifugal counter and co-current exchange devices and more particularly to such devices having rotors with interchangeable separator bands or sections thereof of varying perforation or orifice sizes and patterns and designed for varying and controlling the droplet dispersion of liquids flowing therethrough. This is a continuation in part from our earlier filed and presently pending application entitled "Centrifugal Countercurrent Exchange Device With Fully Adjustable Apertures," Serial No. 272,718, filed April 12, 1963.

As was explained in several of our prior patents and co-pending patent applications, in some of which we were individidual applicants and in others in which we were joint applicants; the single most important factor upon which the efficiency of any extraction device is dependent is the degree to which intimate mixing of the liquids may be subjected in the device. The intimate mixing of the liquids is achieved by dispersion of the liquids into droplets. Control of the character and extent of the droplet dispersion is in turn dependent upon various characteristics of the liquids being processed, including:

(1) The volumetric ratio of the liquids to each other.
(2) The difference in viscosity of the liquids.
(3) The miscibility or immiscibility of the liquid.
(4) The difference in surface tension of the liquid.
(5) The difference in specific gravity of the liquid.
(6) The tendency of the liquids to emulsify.

Variations in one or more of the above characteristics may sometimes affect either the entire process or another characteristic which in turn then requires variation in the mixing energy. This, of course, we have controlled heretofore in our prior devices by affording means for controlling or varying the droplet dispersion. Thus, for example, in U.S. Patents Nos. 3,114,706 and 3,132,100 there was provided replaceable disc columns having varying orifice sizes and patterns by means of which the perforation patterns of the seaprator bands could be varied. In our co-pending patent application entitled "Centrifugal Countercurrent Exchange Device With Fully Adjustable Apertures" filed April 12, 1963, Serial No. 272,718, we have provided separator bands with elongated apertures closed by removable aperture strips having varying perforation patterns and orifice sizes therein.

From the foregoing, it will be realized that all of our prior efforts have been directed to varying or controlling the droplet dispersion in the device by affording means for varying the perforations or orifices in the bands of the rotors, but only in certain specified areas or portions of said bands.

Even though the aforementioned devices, by rendering a countercurrent exchange device adjustable comprised improvements over former devices, the perforation patterns in these devices could only be varied in those portions of the separator band which accommodated the disc columns or removable aperture strips. Thus, the major portion of the contact area of the separator bands either were left imperforate or the perforations therein were left unadjustable. The devices therefore could not be adjusted or varied to the same extent that would be possible if the perforations of the total area of the separator bands were capable of variation.

It is therefore a primary object of this invention to provide a centrifugal exchange device having means for substantially unlimited adjustability of the aperture sizes and characteristics of all or any part of the separator bands contained therein.

Hence, in accordance with our invention, we have provided several embodiments of centrifugal counter and co-current exchange devices having removable concentric bands in order that said bands may be interchanged with other bands to vary the pattern and size of the perforations over the total contact area or any desired portion of the contact area of the bands.

In other embodiments of our invention we have provided means whereby preselected sections of the bands or even certain complete bands may be left entirely imperforate, thereby extending the versatility of the device to one having a substantially limitless pattern of coalescence area.

From our experimentation with removable separator bands in a centrifugal countercurrent exchange device, it became readily apparent that the commercial feasibility of such devices depended upon the expediency with which the bands or sections thereof could be removed so that the exchange devices could be changed over from one liquid system to another with as little "down time" as possible.

It is therefore a further object of this invention to provide simple and expedient structures to enable the rapid removal and replacement of either complete separator bands or sections thereof with similar separator bands or sections having different perforation patterns.

It further became apparent that, in order to provide an expedient method of removing the separator bands and interchanging them, the same had to be accomplished with as little dismantling of the machine as possible. Therefore, another object of this invention is to provide an expedient structure for interchanging separator bands wherein the exchange device requires no actual dismantling to effect said change.

In accordance with this invention, we have provided separator bands that are divided into a plurality of sections with juncture portions that are held together by joining means of different types which enable the operator of a countercurrent exchange device to effect removal expeditiously by merely adjusting the end plate of the rotor and disengaging the joints from said separator bands.

To effectuate expedient removal and interchangeability of the concentric bands, it also became apparent that a structure which could rapidly accomplish the removal of several bands or even sectors (vis. "pie-shaped sections") of the complete rotor would be advantageous and would result in less "down time" of the machine.

It therefore is another object of this invention to provide a means for replacing a plurality of the removable separator bands simultaneously. Thus, in one embodiment of our invention we have provided a plurality of separate sections in the separator bands which are joined together to form "banks" so that they may be removed simultaneously. By this means the entire rotor contact area may be replaced if desired.

With the foregoing and other objects in view, which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of structure may be made without departing from the spirit or sacrificing any of the advantages of the invention.

For the purpose of facilitating an understanding of our invention, we have illustrated in the accompanying drawings preferred embodiments, from an inspection of which, when considered in connection with the following description, our invention, its mode of construction, assembly and operation, and many advantages should be readily understood and appreciated.

Referring to the drawings in which like characters of reference are employed to indicate corresponding parts throughout the several figures:

FIG. 2 is a skeletal sectional view of a preferred embodiment of removable concentric separator bands;

FIG. 3 is a view similar to FIG. 2, illustrating similar separator bands, the segments of which are removably joined together by similar means, but with each band comprised of a greater number of segments;

FIG. 4 is an enlarged sectional view illustrating the details of construction of the band segment-joining means;

FIG. 5 is a perspective view of the structure of FIG. 4;

FIG. 6 is also a partial fragmentary skeletal sectional view of concentric separator bands having separate sections removably joined together but with another embodiment of band-joining means;

FIG. 7 is an enlarged detailed sectional view of one of the band-joining means and adjacent band portions of FIG. 6;

FIG. 8 is a perspective view of the structure of FIG. 7, illustrating the band-joining means assembled with the juncture portions of the separator bands;

Figure 1:
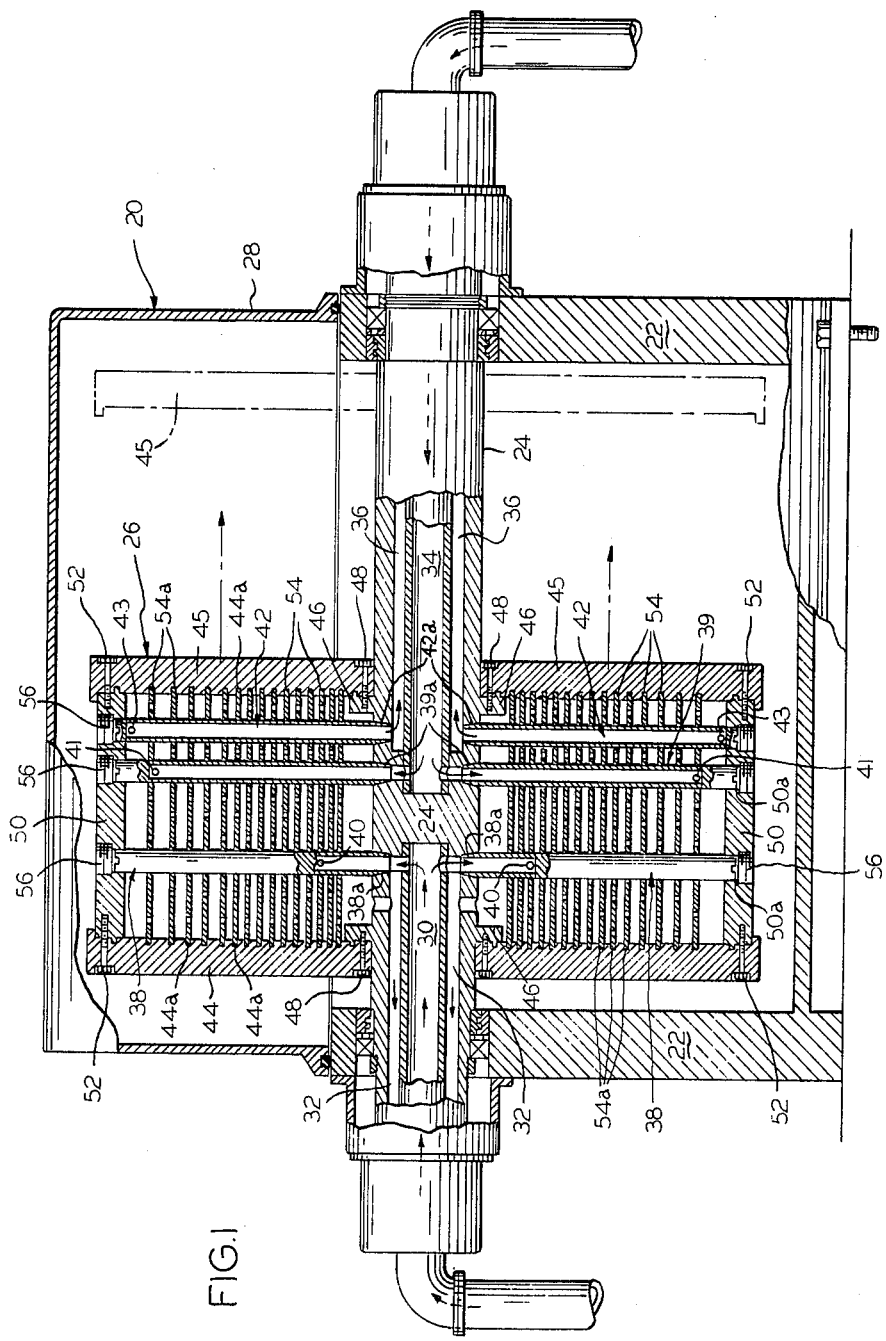
FIG. 1 is a vertical sectional view of a centrifugal counter and co-current exchange device embodying the invention, with portions thereof being shown in elevation.

Referring now to FIG. 1 of the drawings, the reference numeral 20 indicates generally the rotating centrifugal countercurrent device embodying our invention. Since the basic device is generally well known, a detailed description thereof appearing in such patents as U.S. Patent Nos. 3,107,218 and 3,114,706; only so much thereof as is necessary for an understanding of the subject invention will be here described. The device 20 may comprise a pair of standards 22, 22 through which is journalled a rotating shaft 24. A cylindrical rotor indicated generally by reference numeral 26 is connected to the shaft 24 for rotation therewith. A semi-cylindrical housing 28 is removably associated with the standards and may be provided with a handle (not shown) to provide ready access to the rotor 26.

The shaft 24 may be journalled in any suitable manner, as shown in our aforementioned patents. Shaft 24 is provided with suitable passageways 30, 32 for respectively supplying the higher gravity or heavier liquids (influent) through the central area of the rotor 26 and removing the lower gravity or lighter liquids (effluent) therefrom. Similarly, suitable passages such as 34, 36 are provided for respectively supplying the lighter liquid under pressure to the peripheral area of the rotor 26 and removing the heavier liquid therefrom. Thus, it will be seen that perforated feeder tubes such as 38 are provided with their inner ends 38a threadedly associated with the shaft and communicating with the passageway 30 in order to supply heavy liquid to the central portions of the rotor, the feeder tubes 38 having perforations 40 near the shaft of the rotor. On the other hand, feeder tubes such as 39 are associated with the shaft at their inner threaded ends 39a and communicate with the passageway 34 to provide lighter liquid under pressure to the periphery of the rotor, by means of the perforations 41 located proximate to the periphery of the rotor. Feeder tubes such as 42 similarly have their inner ends 42a threadedly associated with the shaft to remove heavier liquids located at the peripheral portions of the rotor, the feeder tubes 42 having perforations located near said peripheral portions.

In FIG. 1, the rotor 26 preferably comprises a pair of circular end walls 44, 45, which are held rigidly to the shaft 24 by a pair of annular flanges 46 extending from the shaft and threadedly associated therewith by bolts 48. However, when the bolts 48 are unfastened, the end walls can be slid along the shaft 24. Thus, in this preferred embodiment the end wall 45 can be moved from its operative position retaining the separator bands to the position shown in phantom outline whereby access to the separator bands 54 can be readily gained. The shaft 24 and housing 28 preferably have been elongated to allow clearance for the separator bands 54 when they are removed from the rotor. It should, however, be realized that this construction, while it presents an advantageous structure for removing the separator bands, is not essential for our invention. Other suitable constructions are contemplated as will be more fully explained hereafter.

The end walls 44, 45 are connected together adjacent to their periphery by a cylindrical shell 50, said shell being secured to said end walls by removable fastening means such as a plurality of bolts 52. As may be seen in the drawings, a plurality of concentric perforated separator bands 54 which are divided into separate segments or sections in accordance with the views hereafter and have their marginal edges or sides 54b removably associated with the concentric circular grooves 44a formed in the end walls 44, 45. The concentric perforated separator band segments may be joined together in various ways as will be more fully described hereafter. The cylindrical shell 50 has cavities 50a formed therein to receive the outer ends of the feeder tubes 38, 39 and 42, which fit snugly against plugs 56 which are threadedly associated therewith. Of course, when it is desired to remove the feeder tubes for the purpose of enabling the removal of the separator bands 54, the plugs 56 are unfastened from the cylindrical shell thereby providing access to the feeder tubes for their removal.

As was mentioned in the recitation of the objects, in order to provide replaceable separator bands that can be readily removed from the machine, the separator bands 54 are formed in separate sections. However, in our first embodiment, as illustrated in FIG. 2, the separator bands are not actually comprised of segments but instead are made with a pair of adjacent juncture portions 58, 59, so that the band may be joined together or taken apart at that point. Although these separator bands merely have one juncture and are not really in separate sections, the principles of this invention still apply. Merely a diagrammatic view of the concentric separator bands 54 is shown in FIG. 2. However, as heretofore explained, the concentric separator bands are preferably removably associated with the rotor by means of their marginal edges 54a fitting into the rotor end wall grooves 44a.

The embodiment shown in FIG. 3 does indeed have rotor bands 54 each formed of a plurality of segments 54a. Each segment 54a is joined at each of its ends to adjoining segments by means of the same type of juncture as in FIG. 2.

Referring more in detail to the juncture portions 58, 59 as illustrated in FIGS. 4 and 5, it will be noted that the same include a pair of ends which terminate in opposing C shaped portions 60. Each of the C shaped portions 60 has a free end 60a and a closure slot 60b defined thereby, which is sized to receive the end of a band joining member 63. The band joining members 63 extend transversely along the periphery of the separator bands at the juncture portions 58, 59. The band joining member 63 illustrated in FIGS. 4 and 5 includes a pair of opposing C shaped ends 63a extending from a body 63b interposed therebetween. The ends 63a also define closure slots 61, 61. The closure slots 61, 61 and 60b, 60b are sized and disposed to removably interlock with the free ends 60a, 60a and 63a, 63a when the band joining means 63 are associated with each pair of juncture portions 58, 59.

In FIGS. 6, 7 and 8, there is illustrated another embodiment of our invention wherein the separator bands are formed from a plurality of sections 66 having juncture portions 68, 69 at each end thereof. However, these juncture portions are joined together by band joining means 71 which differ somewhat from the previously described band joining means. The band joining means 71 have H shaped cross sections and they extend transversely along the separator bands to removably receive the juncture portions 68, 69. Thus, from FIGS. 7 and 8 it can be seen that the band joining means 71 each have closure slots 71a, 71a defined therein on opposing sides of the strip to receive the adjacent ends of the separate sections 66. The H cross sectioned band joining means 71 are particularly advantageous where it is desired to join the separate sections 66 of the separator band without bending the juncture portions 68, 69.

Figure 9:
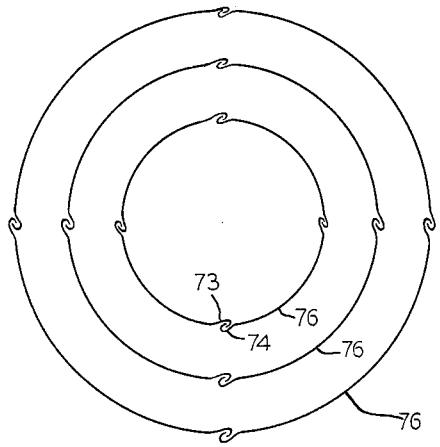
FIG. 9 is a skeletal sectional view illustrating another embodiment for removably joining together segments of separator bands.
Figure 10:
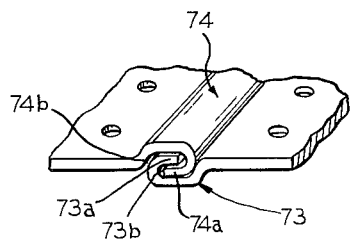
FIG. 10 is an enlarged detailed perspective view of one of the juncture portions of one of the segments of the separator bands of FIG. 9.

Another alternative structure for joining separate sections of separator bands is illustrated in FIGS. 9 and 10 wherein the juncture portions 73, 74 at each end of the separate sections 76 of the separator band 78 afford joining means in the form of reversed C sections. Each of the C sections has a free end 73a, 74a respectively forming closure slots 73b, 74b. The C sections have their free ends received by the closure slots of each other to interlock and form a reverse C joint with each pair of juncture portions 73, 74. Thus, in this embodiment, a separate band joining means is unnecessary.

Figure 11:
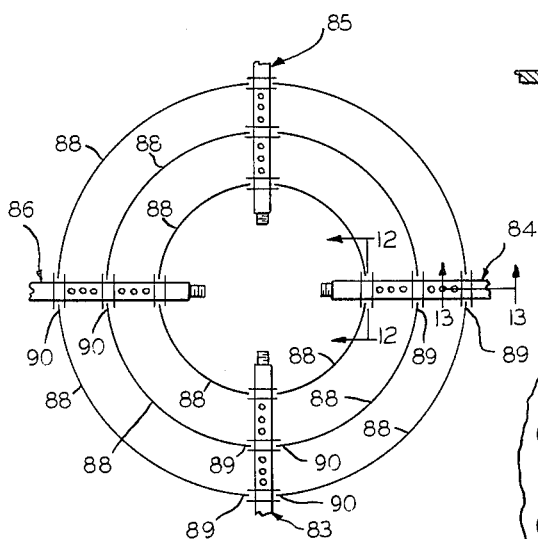
FIG. 11 is a sectional view of another embodiment of this invention, wherein the juncture portions of the separate sections of the concentric separator bands are joined together with band-joining means that are permanently associated with the feed tubes of the exchange device.
Figure 13:
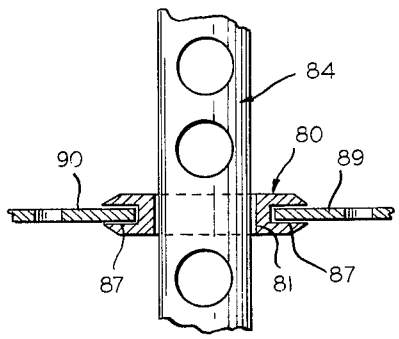
FIG. 13 is an enlarged fragmentary sectional view taken on a plane through the line 13—13 in FIG. 11 and viewed in the direction indicated.
Figure 12:
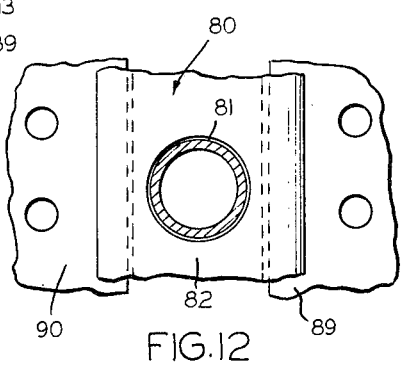
FIG. 12 is an enlarged fragmentary sectional view taken on a plane passing through the line 12—12 in FIG. 11, viewed in the direction indicated and showing how the band-joining means are associated with the feed tubes and juncture portions of the separator band.

In FIGS. 11, 12 and 13, still another alternative embodiment of our invention is shown. In this embodiment, each band joining means 80 has an aperture 81 formed therein that is rigidly associated with one of the feeder tubes 83, 84, 85 and 86 which extend radially from the shaft of the centrifugal countercurrent device. The tubes protrude through said apertures. The feeder tubes in FIG. 11 are preferably spaced apart 90° in order that the band joining means 80 can join separate sections 88 each having an arcuate length of substantially 90°. The band joining means 80 may have an H shaped cross section similar to that illustrated in FIGS. 6, 7 and 8. The band joining means includes a body portion 82 having an aperture 81 formed therein at the mid point thereof with a pair of closure slots 87, 87 formed at opposite ends. As in the case of the other separate sections heretofore described the separate sections 88 have juncture portions 89, 90 at opposite ends thereof for removable association with the closure slots 87, 87.

The band joining means 80 can be removably and selectably positioned with respect to the feeder tubes in a number of known ways. Thus, the band joining means 80 can be selectively positioned along the feeder tubes to thereby determine the distance between the separator bands formed by the separate sections 88. This type of embodiment is particularly advantageous where it is desired to position the separator bands so that the distance between them may be varied. Such an embodiment, therefore, could be used in place of having grooves formed in the end walls to retain the separator bands in position.

Figure 14:
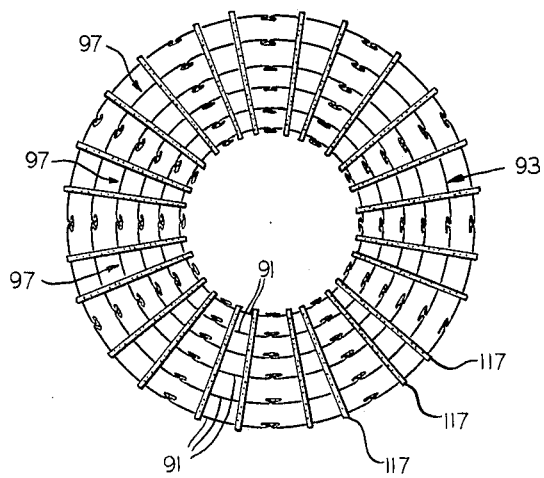
FIG. 14 is a diagrammatic view of another embodiment of our invention illustrating banks of removable sections wherein a plurality of removable sections of the concentric bands are rigidly associated with one another so that they may be removed simultaneously.
Figure 15:
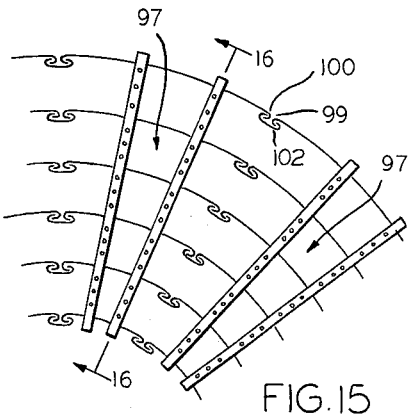
FIG. 15 is an enlarged fragmentary view of FIG. 14.
Figure 17:
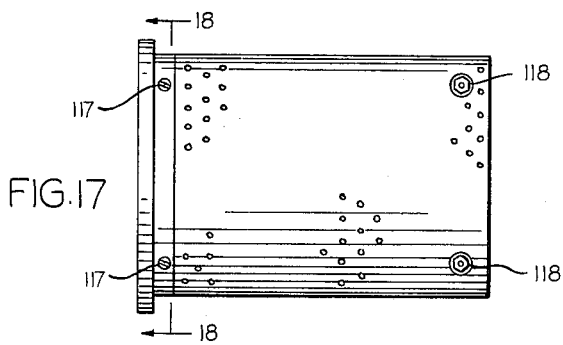
FIG. 17 is a top plan view of the bank illustrated in FIG. 16 taken along a plane passing through the irregular line 17—17 and viewed in the direction indicated.
Figure 16:
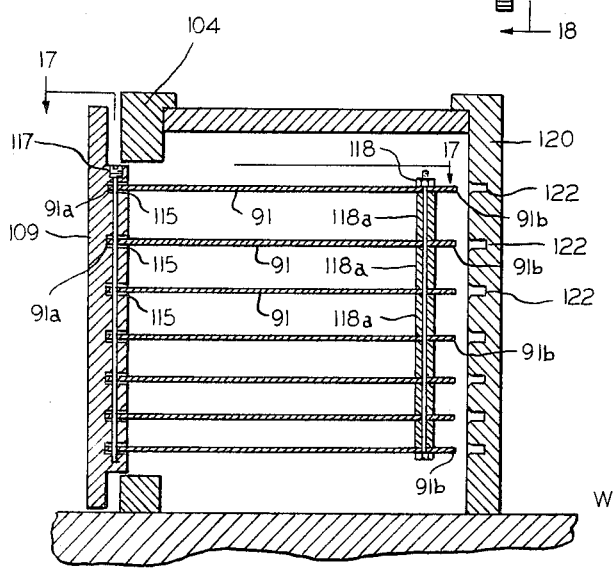
FIG. 16 is a sectional view taken along a plane passing through the line 16—16 in FIG. 15, viewed in the direction indicated, illustrating a preferred embodiment of an assembly of the removable sections forming a bank, and showing said bank associated with the rotor casing end walls of the device.
Figure 19:
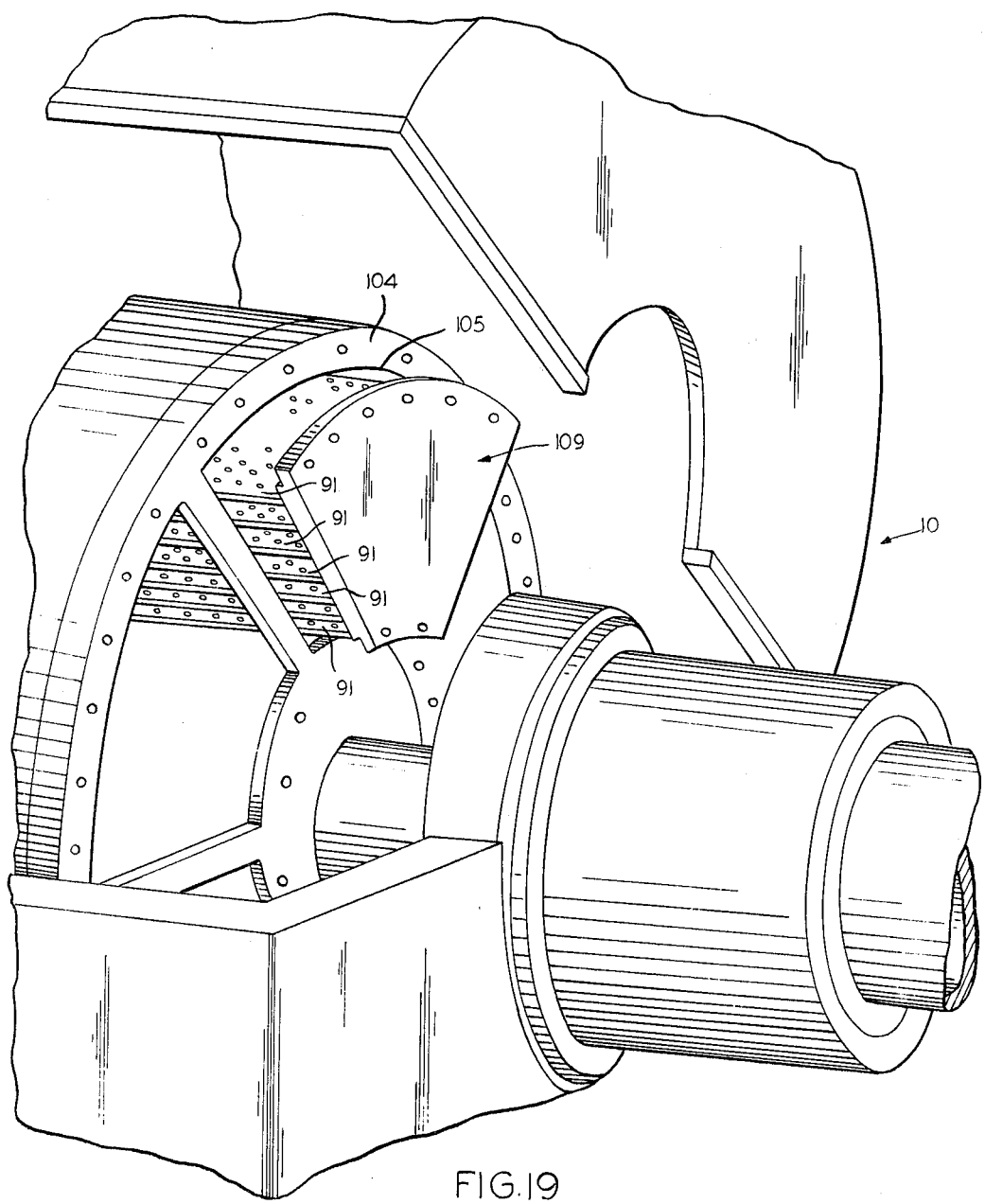
FIG. 19 is a perspective view of a centrifugal countercurrent exchange device showing the outer casing thereof opened and one of the banks of removable sections being initially inserted into its operative position within the rotor.

To fulfill the object of providing separator bands that are divided into a number of separate sections and can be expeditiously removed therefrom, we have illustrated, in FIGS. 14 through 16, a preferred embodiment of a plurality of separate sections 91 joined together by a removable fastening means to form banks 97 with the separate sections. As seen in FIGS. 14 and 15, the banks are pie-shaped and occupy a certain volume sector of the rotor so that when they are joined together, they preferably occupy a full 360°. In the embodiment shown, the juncture portions 99, 100 are joined together by band joining means 102. Of course, the banks of joined together sections can be removably associated with a rotor in a number of ways. In FIG. 19, a portion of a countercurrent exchange device 103 having pie-shaped sector openings 105 in one of the end walls 104, is shown. Removable means, such as the pie-shaped sectors 109, shaped to fit tightly in the openings 105 when they are removably assembled therewith. In this embodiment, the seperate sections 91 of separator bands are associated with each other and to the pie-shaped sector to provide a removable "bank," which enables the pie-shaped sector 109 with its separate sections to be removed simultaneously. It should be appreciated that by removing and replacing all the sections 109 of the rotor, the entire rotor is thereby interchanged without requiring the dismantling of the entire machine.

Figure 18:
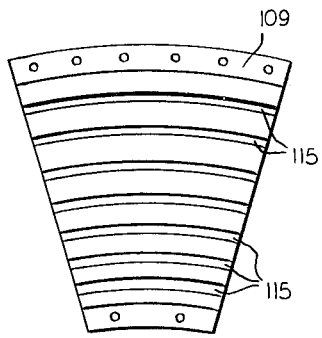
FIG. 18 is a fragmentary sectional view taken along a plane passing through the line 18—18 in FIG. 17 and viewed in the direction indicated.

As may be noted in FIGS. 16 and 18, the pie-shaped sector 109 may have concentric grooves 115 formed therein, which can conform to the length and contour of the separate sections that form the removable bank 97. These grooves 115 receive one of the sides 91a of the separate sections for rigidly fastening the separate sections to the pie-shaped sector 109. A pair of first removable fastening means 117 protrude through the pie-shaped sector and each of the grooves 115 to simultaneously and removably fasten the sides 91a of the separate sections to the pie-shaped sectors 109. The other sides 91b of the separate sections have a pair of second removable fastening means 118 extending therethrough for holding the separate sections together. Tubular spaces 118a are positioned on the fastening means 118 and interposed between each of the separate sections to maintain a preselected spacing between the sections in accordance with the space between the grooves 115. The other end wall 120, which is opposite to the end wall 104, also has concentric grooves 122 formed therein, which are in opposing relationship and alignment with the grooves 115 to removably receive said other side 91b of the separate sections 91. Although we have provided a pair of removable fastening means protruding through each of the sides of the separate sections, any number thereof can be used.

In summarizing our invention and realizing the full import and wide significance thereof, it will be seen that the devices we have provided achieve the objectives of our invention in a remarkably unexpected fashion. The one basic thread of continuity between all of the embodiments illustrated resides in the provision of separator bands, which have at least a pair of juncture portions that are removably fastened together in order that the separator bands can be disassembled from the rotor of a centrifugal countercurrent exchange device without necessitating the total dismantling of the same to effect such a change. The removal and replacement of the separator bands depends on how they are associated with the rotor. For instance, where the separtor bands are retained in a rotor having solid end walls such as is pictured in FIG. 1, one of the end walls can be unfastened from the rotor and slid along the shaft so that after the separator bands have their juncture portions disassembled and the feeder tubes removed, the separator bands can be withdrawn from the rotor and enough clearance is provided for removing the same after the casing has been opened. In this manner, if desired, the entire rotor may be replaced, band by band.

On the other hand, where the end walls of the rotor have openings therein with sections such as the pie-shaped sector 109 cut out therefrom, the end wall would not have to be disassembled from the rotor and slid away therefrom to provide clearance for the separator bands. Merely removing the cut out sectors would be sufficient for providing access to the separator bands. Thus, it is apparent that our invention should not be limited to the constructions of the rotor illustrated as it is obvious that it is merely necessary to have one of the end walls constructed and positionable to enable gaining access to the separator bands to disassemble them at their juncture portions and remove or replace the same. Still further, while we have shown the end walls as having grooves therein for receiving the separator bands, the same is not necessary, as the separator bands could be positioned removably with the construction illustrated in the FIGS. 11, 12, and 13, where the feeder tubes have strip-joining means associated therewith for receiving the separate sections of the separator bands. Also, when providing a bank of removable separate sections, such as illustrated in FIGS. 14 through 19, it is not necessary to have sectors cut from the end walls or rigidly associated with the sides of the separate sections. It is quite apparent that the separate sections can be joined together and function as intended even in a rotor having solid end walls as illustrated in FIG. 1.

Still further, we intend this invention to apply to different shapes of separator bands other than concentric.

It is believed that our invention, its mode of construction and assembly, and many of its advantages should be readily understood from the foregoing without further description, and it should also be manifest that while preferred embodiments of the invention have been shown and described for illustrative purposes, the structural details are nevertheless capable of wide variation within the purview of our invention as defined in the appended claims.

What we claim and desire to secure by Letters Patent of the United States is:

1. A centrifugal countercurrent exchange device, including a rotor rigidly mounted on a rotatable shaft, said rotor comprising: a pair of end walls attached to said shaft, a plurality of concentric separator bands removably positioned in said rotor, at least one of said separator bands having at least a portion thereof formed with orifices, at least one said separator bands having at least a pair of axially extending juncture portions, means separably joining said portions together, a plurality of perforated feeder tubes removably associated with said rotor and in communication with said shaft, said feeder tubes extending radially outward from said shaft toward the periphery of said rotor by projecting through said separator bands, said feeder tubes being perforated to remove lighter liquid from the interior of said rotor in proximity to the shaft thereof and for discharging heavier liquid from the interior of said rotor in proximity to the periphery thereof, and at least one of said end walls having means for gaining access to said separator bands with said juncture portions for disassembling the joining means from their juncture portions, whereby said separator bands with said juncture portions can be selectively removed and replaced by first removing said feeder tubes from said rotor to provide different mixing energy characteristics in said rotor.

2. A centrifugal countercurrent exchange device, as defined in claim 1, in which said separator bands are comprised of a plurality of separate sections, said separate sections each having a juncture portion at both circumferential ends thereof, and said access means is positioned in openings formed in said end wall, said openings being disposed and sized to enable the removal and replacement of said separate sections.

3. A centrifugal countercurrent exchange device as defined in claim 1, in which said end walls have grooves therein removably receiving said separator bands, said separator bands having marginal portions thereof removably positioned in said grooves, one of said end walls being rigidly attached to said shaft and rotor to retain said separator bands in one position, the other of said end walls being slidably positionable along said shaft, whereby said latter-mentioned end wall can be moved from a position retaining said separator bands to a position where access to said separator bands with juncture portions can be gained for selective removal and replacement thereof.

4. A centrifugal countercurrent exchange device, as defined in claim 1, wherein at least one of said juncture portions of said separator bands is formed in the shape of a C extending axially along said separator bands, each of said C sections having a closure slot and a free end, said C sections being disposed so that the free end of one interlocks with the closure slot of another to form a reverse C joint with each pair of said C shaped juncture portions, whereby said separator bands can be joined together or taken apart at said C shaped juncture portions without any additional members.

5. A centrifugal countercurrent exchange device, as defined in claim 1, in which at least one of said joining means is formed in the cross section of an H, and said H shaped cross section having a pair of closure slots at opposite side thereof in which at least one of pair of said juncture portions of said separator bands is removably positioned.

6. A centrifugal countercurrent exchange device, as defined in claim 1, in which each juncture portion has a C shaped portion formed thereon extending transversely along each separate section of said separator band, said C shaped portions having free ends and closure slots formed thereby facing in opposite directions in each pair of juncture portions, said joining means formed with a body and a C shaped portion extending from each side thereof, said latter-mentioned C shaped portions each having a free end and a closure slot formed therein to afford interlocking means when one of said free ends is positioned in one of said closure slots.

7. A centrifugal countercurrent exchange device, as defined in claim 1, in which said separator bands are comprised of a plurality of separate sections, said separate sections of said separator bands each having a juncture portion at both circumferential ends thereof for removably joining the same together, said separator bands forming at least one bank wherein said sections of said separator bands occupy a certain volume and are joined together to enable the simultaneous removal and replacement of said bank of separate sections.

8. A centrifugal countercurrent exchange device, as defined in claim 7, in which said end wall is formed with at least one opening, said access means being disposed in said opening, said opening being disposed and sized to enable the removal and replacement of said bank of separate sections when said access means being disassociated from said end wall.

9. A centrifugal countercurrent exchange device, as deﬁned in claim 8, in which said bank of separate sections is rigidly joined with said access means, whereby said access means and said bank may be removed simultaneously from said rotor.

10. A centrifugal countercurrent exchange device, as defined in claim 9, in which said access means has concentric grooves formed therein, said grooves conforming to a portion of the length and contour of said separate sections forming said bank, said grooves receiving one of the marginal sides of said separate sections for rigidly fastening said separate sections to said access means, and a first removable fastening means protruding through said access means and all of said grooves to simultaneously and removably fasten said marginal sides of said separate sections to said access means.

11. A centrifugal countercurrent exchange device, as defined in claim 10, in which the other of said end walls has grooves formed therein, said grooves in said other end wall being in alignment and in opposing relationship with the grooves in said access means, said latter-mentioned grooves removably receiving the other marginal sides of said separate sections of said bank, a second removable fastening means extending through said latter-mentioned marginal sides for removably holding said separate sections together, and spacers positioned on said fastening means and interposed between each of said separate sections to maintain a preselected spacing between said separate sections.

12. A centrifugal countercurrent exchange device, as defined in claim 9, in which there are a plurality of banks of separate sections formed in said rotor and said banks each have a "pie-shaped" cross section.

13. A centrifugal countercurrent exchange device, including a rotor rigidly mounted in a rotatable shaft, said rotor comprising: a pair of end walls attached to said shaft, a plurality of concentric separator bands removably positioned in said rotor, at least one of said separator bands having at least a portion thereof formed with orifices, at least one of said separator bands being divided into sections having axially extending juncture portions at each end thereof, a plurality of perforated feeder tubes removably associated with said rotor and in communication with said shaft, said feeder tubes extending radially outward from said shaft toward the periphery of said rotor by protruding through said separator bands, said feeder tubes being perforated to remove lighter liquids from the interior of said rotor in proximity to the shaft thereof and for discharging heavier liquids from the interior of said rotor in proximity to the periphery thereof, means for removably joining at least one pair of said juncture portions together, said joining means being attached to said feeder tubes, and at least one of said end walls having means for gaining access to said separator bands for selectively removing and replacing said separate sections in said separator bands.

References Cited by the Examiner

UNITED STATES PATENTS

| | | | |
|---|---|---|---|
| 211,241 | 1/1879 | Koch et al. | 220—80 |
| 223,949 | 1/1880 | Preater | 220—80 |
| 417,625 | 12/1889 | Bowers | 68—143 |
| 566,457 | 8/1896 | Kimball | 233—31 |
| 762,624 | 6/1904 | Eck | 233—43 |
| 1,032,827 | 7/1912 | Hamilton | 220—80 |
| 1,170,036 | 2/1916 | Avery | 220—76 |
| 2,191,891 | 2/1940 | Levitetz | 68—143 X |
| 2,861,277 | 11/1958 | Hermann | 4—172 |
| 3,107,218 | 10/1963 | Doyle | 233—39 X |

FOREIGN PATENTS 173,752    7/1906    Germany.

MARTIN P. SCHWADRON, *Acting Primary Examiner.*

M. CARY NELSON, *Examiner.*

H. KLINKSIEK, *Assistant Examiner.*